US012632236B2

(12) United States Patent
Kavuri et al.

(10) Patent No.: US 12,632,236 B2
(45) Date of Patent: *May 19, 2026

(54) CUSTOM CODE ASSISTANT SYSTEM FACILITATING CODE CONVERSION METHODOLOGY

(71) Applicant: Truist Bank, Charlotte, NC (US)

(72) Inventors: Krishnaveni Kavuri, Waxhaw, NC (US); Daniel Caricato, Fort Mill, SC (US); Bjorn Austraat, New York, NY (US)

(73) Assignee: TRUIST BANK, Charlotte, NC (US)

( * ) Notice: Subject to any disclaimer, the term of this patent is extended or adjusted under 35 U.S.C. 154(b) by 288 days.

This patent is subject to a terminal disclaimer.

(21) Appl. No.: 18/440,413

(22) Filed: Feb. 13, 2024

(65) Prior Publication Data

US 2025/0224944 A1     Jul. 10, 2025

Related U.S. Application Data

(60) Provisional application No. 63/618,022, filed on Jan. 5, 2024.

(51) Int. Cl.
| | |
|---|---|
| *G06F 8/41* | (2018.01) |
| *G06F 8/51* | (2018.01) |
| *G06F 8/60* | (2018.01) |
| *G06F 11/3668* | (2025.01) |
| *G06F 21/31* | (2013.01) |
| *G06F 21/62* | (2013.01) |
| *G06F 40/30* | (2020.01) |

(52) U.S. Cl.
CPC ............... *G06F 8/447* (2013.01); *G06F 8/51* (2013.01); *G06F 8/60* (2013.01); *G06F*

*11/3688* (2013.01); *G06F 21/31* (2013.01); *G06F 21/629* (2013.01); *G06F 40/30* (2020.01)

(58) Field of Classification Search
CPC ....................................................... G06F 8/447
See application file for complete search history.

(56) References Cited

U.S. PATENT DOCUMENTS

| | | | |
|---|---|---|---|
| 7,954,084 B2 | 5/2011 | Arcaro | |
| 8,051,410 B2 * | 11/2011 | Marfatia | ................... G06F 8/51 |
| | | | 717/124 |
| 9,372,837 B2 * | 6/2016 | Alli | ....................... G06F 40/154 |
| 9,766,868 B2 | 9/2017 | Allen | |
| 11,669,332 B1 | 6/2023 | Aiyer | |
| 12,019,992 B2 | 6/2024 | Bahrami | |
| 12,346,673 B1 | 7/2025 | Gonugondla | |
| 12,353,854 B2 | 7/2025 | Sikand | |

(Continued)

*Primary Examiner* — Simon P Kanaan
(74) *Attorney, Agent, or Firm* — Michael A. Springs, Esq.; Shumaker, Loop & Kendrick, LLP; Patrick B. Horne

(57) ABSTRACT

Systems and methods obtain a translation request accompanying source code of source file(s) for conversion. Formatting of the source code of the source file(s) is verified and the source code is converted to target code that includes target file(s). The converting (i) maps programming language functions of the source code to corresponding programming language functions of the target code and (ii) utilizes, through customized prompt template(s), one or more large language models (LLMs) hosted by a cloud platform during the code conversion, where a source application that uses the source code includes TIBCO™ software. The target file(s) are distributed.

20 Claims, 13 Drawing Sheets

(56)       References Cited

U.S. PATENT DOCUMENTS

2010/0017785  A1 *   1/2010  Volkmann ............. G06F 16/986
                                                    717/106
2014/0019116  A1     1/2014  Lundberg
2022/0171699  A1 *   6/2022  Velammal ........... G06F 11/3692
2025/0258659  A1     8/2025  Kunz

* cited by examiner

700

714

AI services

712

File storage/ Vector storage

Cloud Platform - Private

710

Large language model

708

Response

Prompt for Code
translation

Code Assistant UI

704

706

Identity and
Access
Management

702

User

800

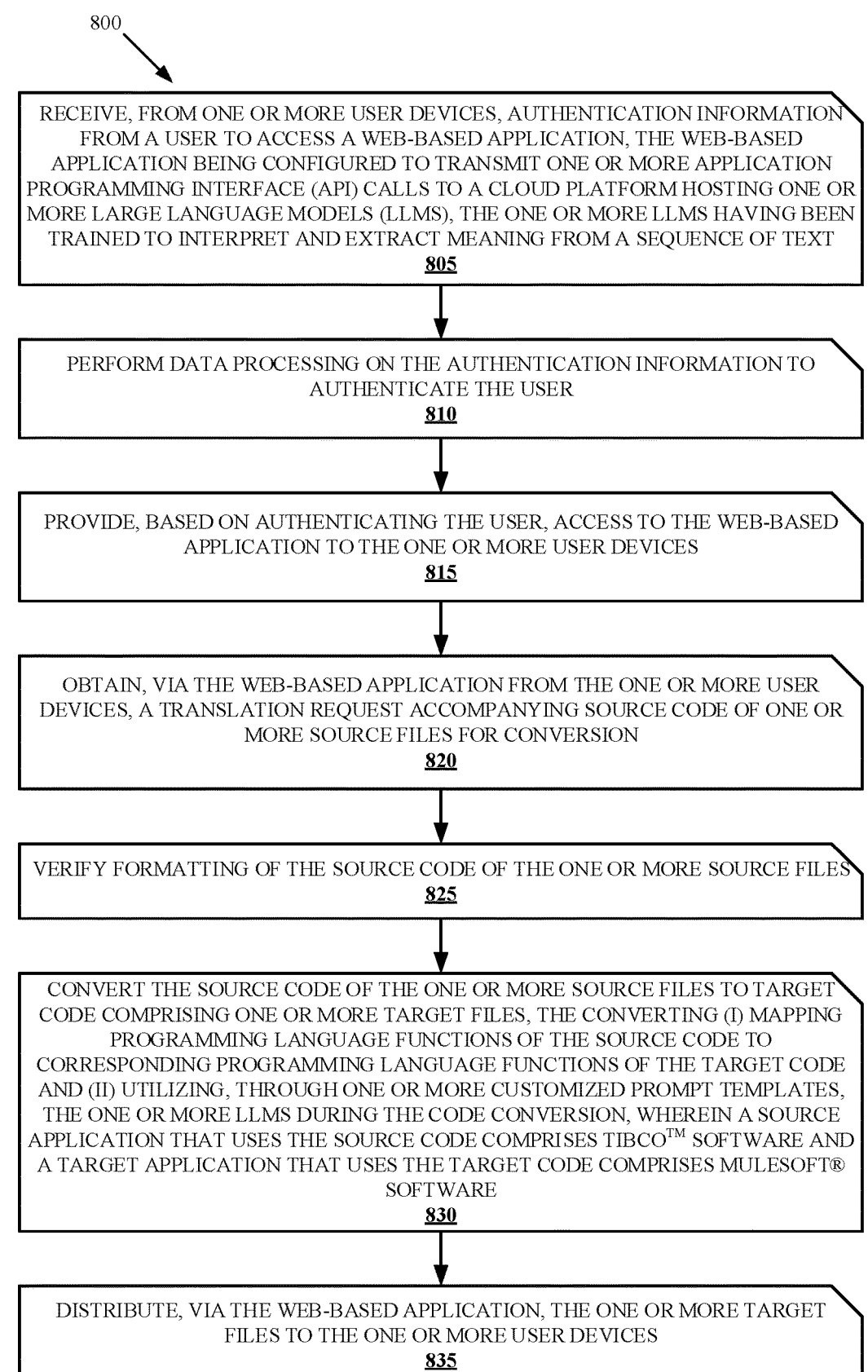

RECEIVE, FROM ONE OR MORE USER DEVICES, AUTHENTICATION INFORMATION FROM A USER TO ACCESS A WEB-BASED APPLICATION, THE WEB-BASED APPLICATION BEING CONFIGURED TO TRANSMIT ONE OR MORE APPLICATION PROGRAMMING INTERFACE (API) CALLS TO A CLOUD PLATFORM HOSTING ONE OR MORE LARGE LANGUAGE MODELS (LLMS), THE ONE OR MORE LLMS HAVING BEEN TRAINED TO INTERPRET AND EXTRACT MEANING FROM A SEQUENCE OF TEXT
805

PERFORM DATA PROCESSING ON THE AUTHENTICATION INFORMATION TO AUTHENTICATE THE USER
810

PROVIDE, BASED ON AUTHENTICATING THE USER, ACCESS TO THE WEB-BASED APPLICATION TO THE ONE OR MORE USER DEVICES
815

OBTAIN, VIA THE WEB-BASED APPLICATION FROM THE ONE OR MORE USER DEVICES, A TRANSLATION REQUEST ACCOMPANYING SOURCE CODE OF ONE OR MORE SOURCE FILES FOR CONVERSION
820

VERIFY FORMATTING OF THE SOURCE CODE OF THE ONE OR MORE SOURCE FILES
825

CONVERT THE SOURCE CODE OF THE ONE OR MORE SOURCE FILES TO TARGET CODE COMPRISING ONE OR MORE TARGET FILES, THE CONVERTING (I) MAPPING PROGRAMMING LANGUAGE FUNCTIONS OF THE SOURCE CODE TO CORRESPONDING PROGRAMMING LANGUAGE FUNCTIONS OF THE TARGET CODE AND (II) UTILIZING, THROUGH ONE OR MORE CUSTOMIZED PROMPT TEMPLATES, THE ONE OR MORE LLMS DURING THE CODE CONVERSION, WHEREIN A SOURCE APPLICATION THAT USES THE SOURCE CODE COMPRISES TIBCO™ SOFTWARE AND A TARGET APPLICATION THAT USES THE TARGET CODE COMPRISES MULESOFT® SOFTWARE
830

DISTRIBUTE, VIA THE WEB-BASED APPLICATION, THE ONE OR MORE TARGET FILES TO THE ONE OR MORE USER DEVICES
835

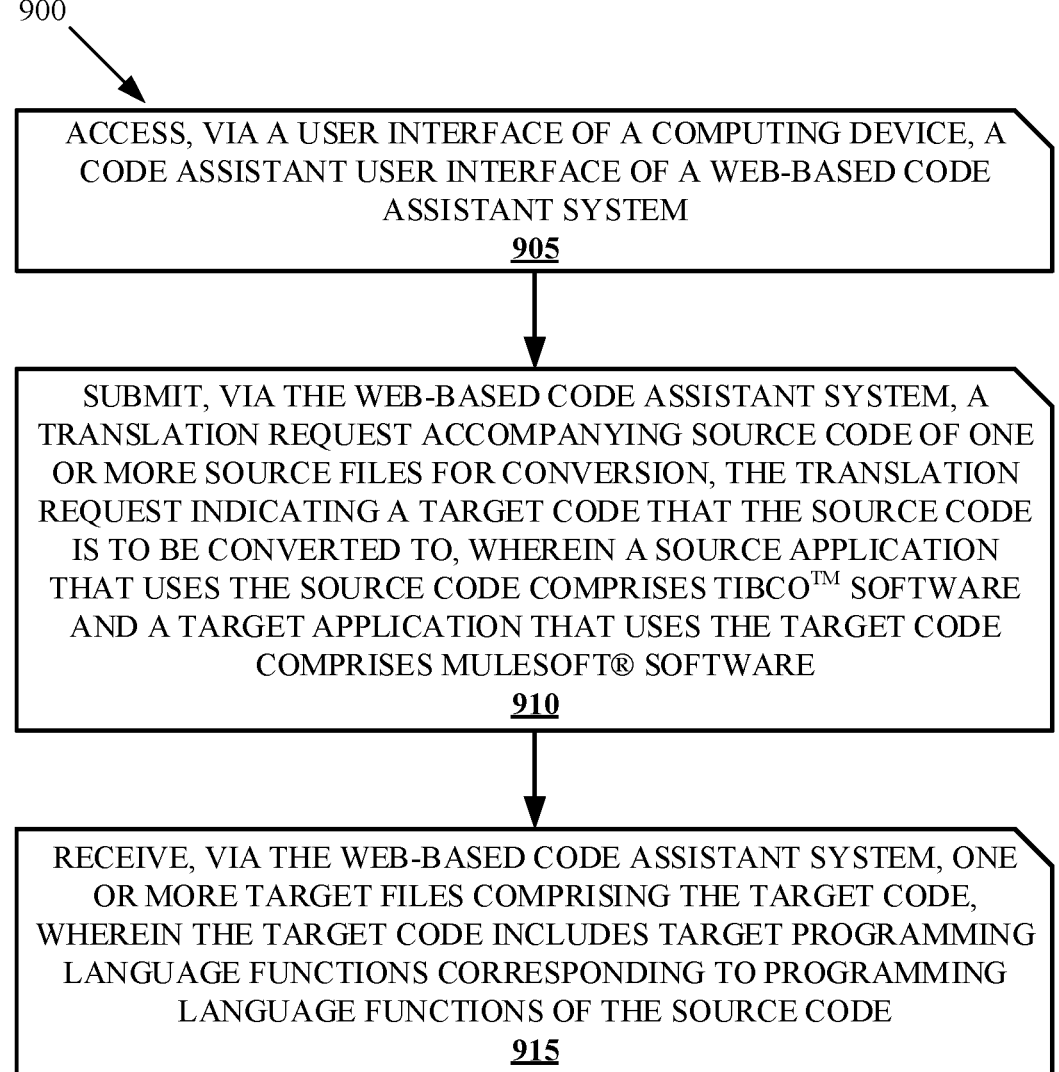

ACCESS, VIA A USER INTERFACE OF A COMPUTING DEVICE, A CODE ASSISTANT USER INTERFACE OF A WEB-BASED CODE ASSISTANT SYSTEM
905

SUBMIT, VIA THE WEB-BASED CODE ASSISTANT SYSTEM, A TRANSLATION REQUEST ACCOMPANYING SOURCE CODE OF ONE OR MORE SOURCE FILES FOR CONVERSION, THE TRANSLATION REQUEST INDICATING A TARGET CODE THAT THE SOURCE CODE IS TO BE CONVERTED TO, WHEREIN A SOURCE APPLICATION THAT USES THE SOURCE CODE COMPRISES TIBCO™ SOFTWARE AND A TARGET APPLICATION THAT USES THE TARGET CODE COMPRISES MULESOFT® SOFTWARE
910

RECEIVE, VIA THE WEB-BASED CODE ASSISTANT SYSTEM, ONE OR MORE TARGET FILES COMPRISING THE TARGET CODE, WHEREIN THE TARGET CODE INCLUDES TARGET PROGRAMMING LANGUAGE FUNCTIONS CORRESPONDING TO PROGRAMMING LANGUAGE FUNCTIONS OF THE SOURCE CODE
915

FIG. 9

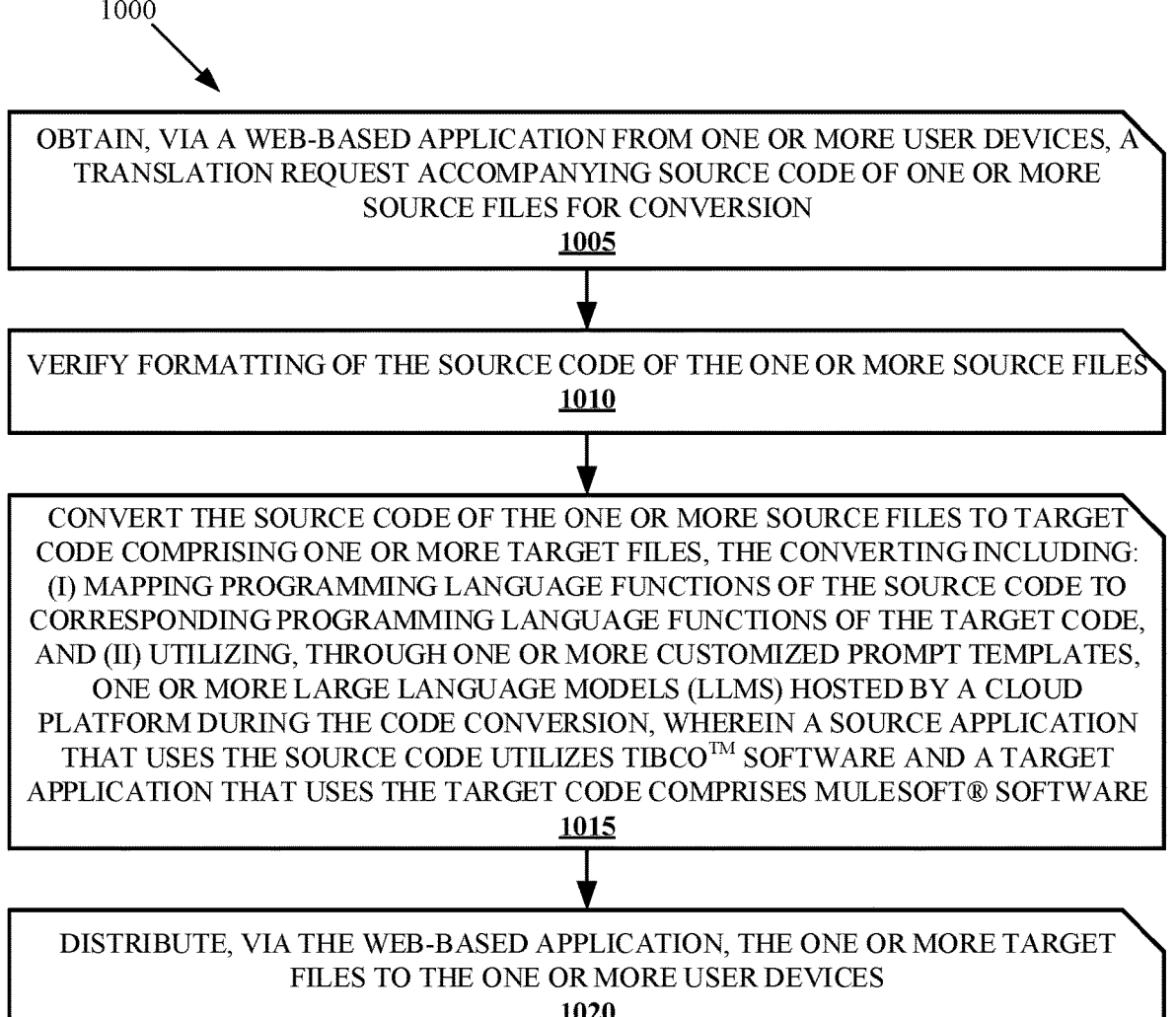

1000

OBTAIN, VIA A WEB-BASED APPLICATION FROM ONE OR MORE USER DEVICES, A TRANSLATION REQUEST ACCOMPANYING SOURCE CODE OF ONE OR MORE SOURCE FILES FOR CONVERSION
1005

VERIFY FORMATTING OF THE SOURCE CODE OF THE ONE OR MORE SOURCE FILES
1010

CONVERT THE SOURCE CODE OF THE ONE OR MORE SOURCE FILES TO TARGET CODE COMPRISING ONE OR MORE TARGET FILES, THE CONVERTING INCLUDING: (I) MAPPING PROGRAMMING LANGUAGE FUNCTIONS OF THE SOURCE CODE TO CORRESPONDING PROGRAMMING LANGUAGE FUNCTIONS OF THE TARGET CODE, AND (II) UTILIZING, THROUGH ONE OR MORE CUSTOMIZED PROMPT TEMPLATES, ONE OR MORE LARGE LANGUAGE MODELS (LLMS) HOSTED BY A CLOUD PLATFORM DURING THE CODE CONVERSION, WHEREIN A SOURCE APPLICATION THAT USES THE SOURCE CODE UTILIZES TIBCO™ SOFTWARE AND A TARGET APPLICATION THAT USES THE TARGET CODE COMPRISES MULESOFT® SOFTWARE
1015

DISTRIBUTE, VIA THE WEB-BASED APPLICATION, THE ONE OR MORE TARGET FILES TO THE ONE OR MORE USER DEVICES
1020

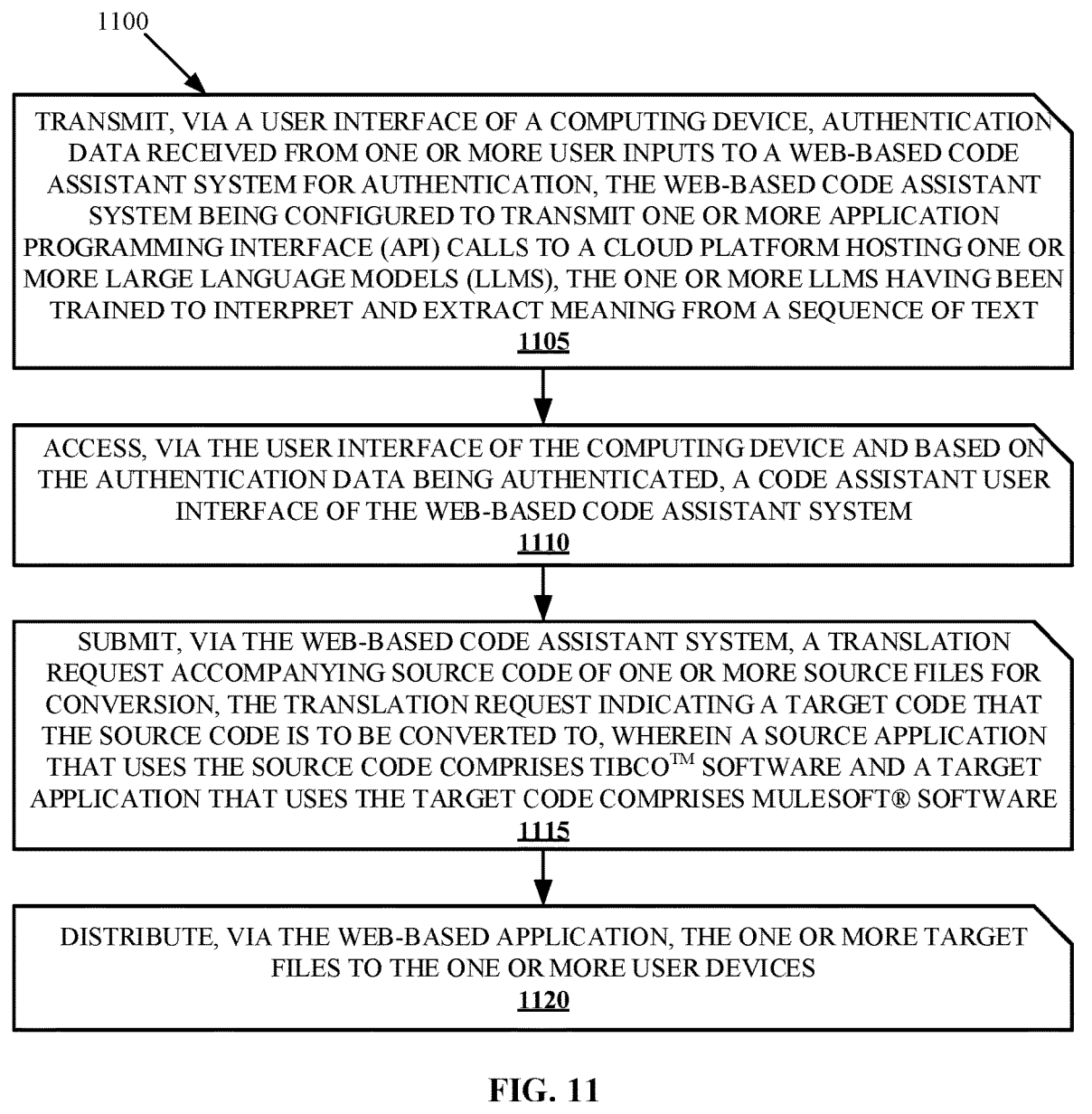

TRANSMIT, VIA A USER INTERFACE OF A COMPUTING DEVICE, AUTHENTICATION DATA RECEIVED FROM ONE OR MORE USER INPUTS TO A WEB-BASED CODE ASSISTANT SYSTEM FOR AUTHENTICATION, THE WEB-BASED CODE ASSISTANT SYSTEM BEING CONFIGURED TO TRANSMIT ONE OR MORE APPLICATION PROGRAMMING INTERFACE (API) CALLS TO A CLOUD PLATFORM HOSTING ONE OR MORE LARGE LANGUAGE MODELS (LLMS), THE ONE OR MORE LLMS HAVING BEEN TRAINED TO INTERPRET AND EXTRACT MEANING FROM A SEQUENCE OF TEXT
1105

ACCESS, VIA THE USER INTERFACE OF THE COMPUTING DEVICE AND BASED ON THE AUTHENTICATION DATA BEING AUTHENTICATED, A CODE ASSISTANT USER INTERFACE OF THE WEB-BASED CODE ASSISTANT SYSTEM
1110

SUBMIT, VIA THE WEB-BASED CODE ASSISTANT SYSTEM, A TRANSLATION REQUEST ACCOMPANYING SOURCE CODE OF ONE OR MORE SOURCE FILES FOR CONVERSION, THE TRANSLATION REQUEST INDICATING A TARGET CODE THAT THE SOURCE CODE IS TO BE CONVERTED TO, WHEREIN A SOURCE APPLICATION THAT USES THE SOURCE CODE COMPRISES TIBCO™ SOFTWARE AND A TARGET APPLICATION THAT USES THE TARGET CODE COMPRISES MULESOFT® SOFTWARE
1115

DISTRIBUTE, VIA THE WEB-BASED APPLICATION, THE ONE OR MORE TARGET FILES TO THE ONE OR MORE USER DEVICES
1120

FIG. 11

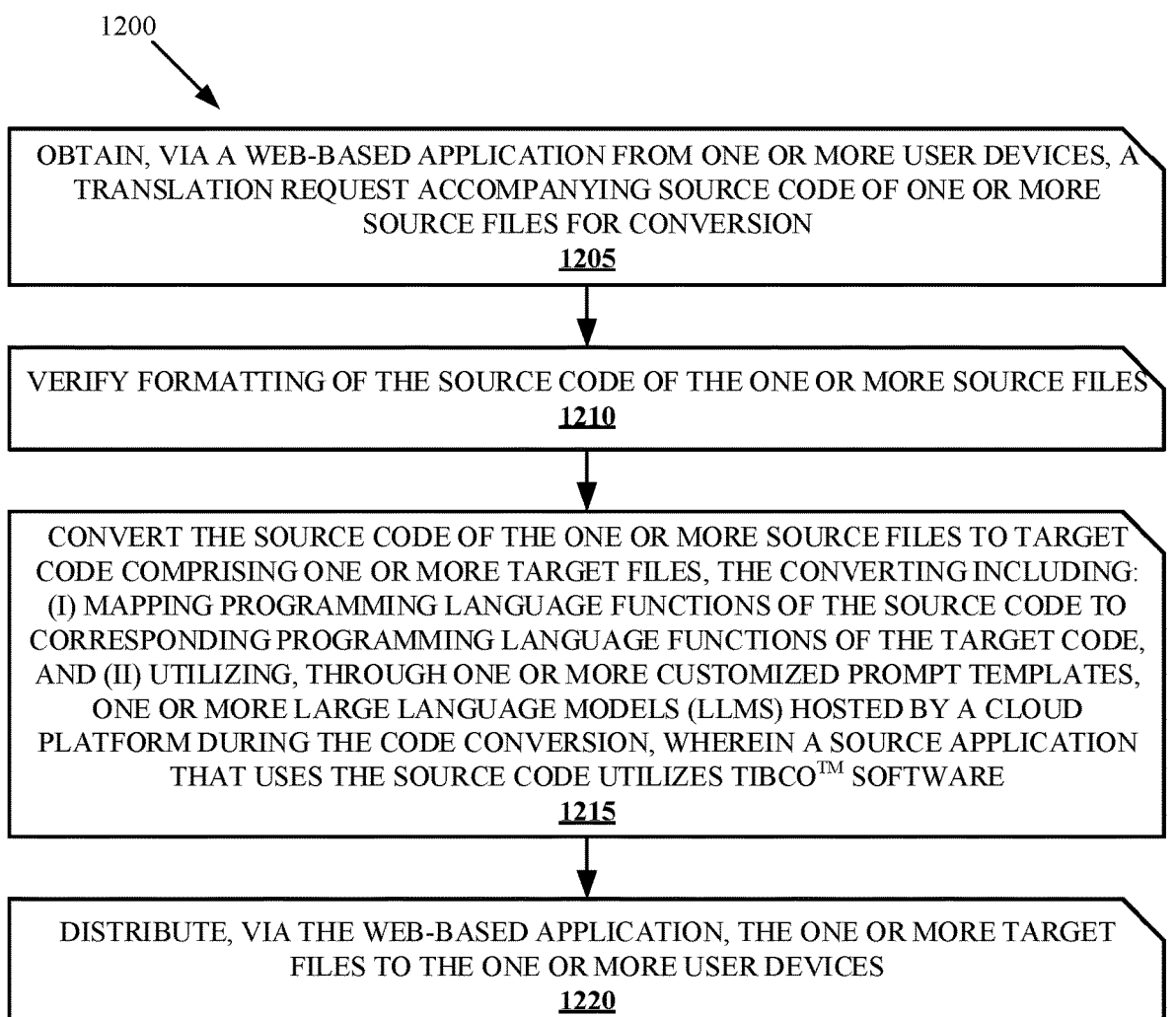

1200

OBTAIN, VIA A WEB-BASED APPLICATION FROM ONE OR MORE USER DEVICES, A
TRANSLATION REQUEST ACCOMPANYING SOURCE CODE OF ONE OR MORE
SOURCE FILES FOR CONVERSION
1205

VERIFY FORMATTING OF THE SOURCE CODE OF THE ONE OR MORE SOURCE FILES
1210

CONVERT THE SOURCE CODE OF THE ONE OR MORE SOURCE FILES TO TARGET
CODE COMPRISING ONE OR MORE TARGET FILES, THE CONVERTING INCLUDING:
(I) MAPPING PROGRAMMING LANGUAGE FUNCTIONS OF THE SOURCE CODE TO
CORRESPONDING PROGRAMMING LANGUAGE FUNCTIONS OF THE TARGET CODE,
AND (II) UTILIZING, THROUGH ONE OR MORE CUSTOMIZED PROMPT TEMPLATES,
ONE OR MORE LARGE LANGUAGE MODELS (LLMS) HOSTED BY A CLOUD
PLATFORM DURING THE CODE CONVERSION, WHEREIN A SOURCE APPLICATION
THAT USES THE SOURCE CODE UTILIZES TIBCO™ SOFTWARE
1215

DISTRIBUTE, VIA THE WEB-BASED APPLICATION, THE ONE OR MORE TARGET
FILES TO THE ONE OR MORE USER DEVICES
1220

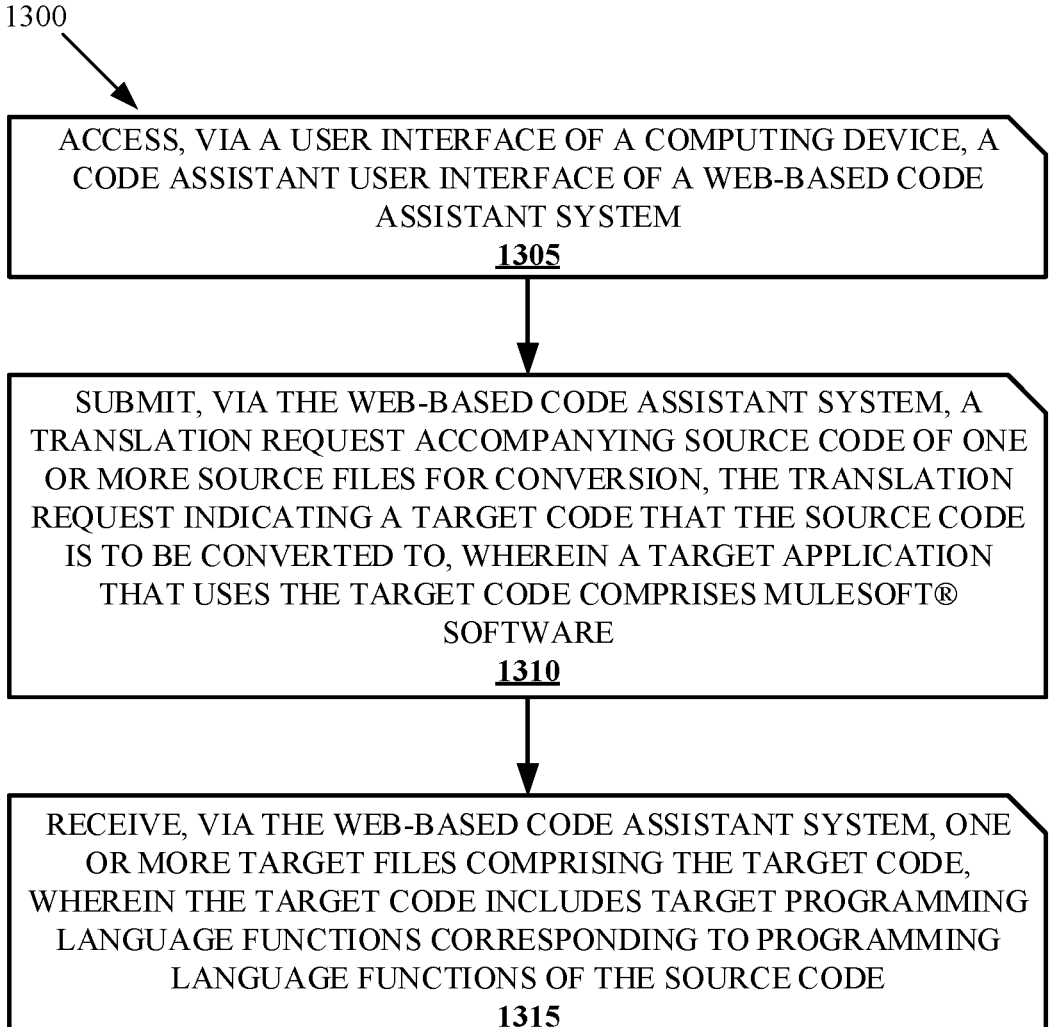

ACCESS, VIA A USER INTERFACE OF A COMPUTING DEVICE, A CODE ASSISTANT USER INTERFACE OF A WEB-BASED CODE ASSISTANT SYSTEM
1305

SUBMIT, VIA THE WEB-BASED CODE ASSISTANT SYSTEM, A TRANSLATION REQUEST ACCOMPANYING SOURCE CODE OF ONE OR MORE SOURCE FILES FOR CONVERSION, THE TRANSLATION REQUEST INDICATING A TARGET CODE THAT THE SOURCE CODE IS TO BE CONVERTED TO, WHEREIN A TARGET APPLICATION THAT USES THE TARGET CODE COMPRISES MULESOFT® SOFTWARE
1310

RECEIVE, VIA THE WEB-BASED CODE ASSISTANT SYSTEM, ONE OR MORE TARGET FILES COMPRISING THE TARGET CODE, WHEREIN THE TARGET CODE INCLUDES TARGET PROGRAMMING LANGUAGE FUNCTIONS CORRESPONDING TO PROGRAMMING LANGUAGE FUNCTIONS OF THE SOURCE CODE
1315

FIG. 13

CUSTOM CODE ASSISTANT SYSTEM FACILITATING CODE CONVERSION METHODOLOGY

CROSS REFERENCE TO RELATED APPLICATIONS

This application claims priority to and benefit of U.S. Provisional Patent Application No. 63/618,022 filed on Jan. 5, 2024 entitled CUSTOM CODE ASSISTANT SYSTEM FACILITATING CODE CONVERSION METHODOL-OGY, the entire contents of which is hereby expressly incorporated by reference.

FIELD OF THE INVENTION

This invention relates generally to the field of code conversion, and more particularly embodiments of the invention relate to a custom code assistant system that facilitates code conversion.

BACKGROUND OF THE INVENTION

Code conversion is an important tool companies use to incorporate and utilize new or more efficient platforms. Often, code translation is driven by the need to align with evolving industry standards and harness advanced capabili-ties. Various software systems provide different integration technologies or other differing features and functions. A need exists to allow companies to incorporate different software systems for different applications.

BRIEF SUMMARY

Shortcomings of the prior art are overcome and additional advantages are provided through the provision of a code assistant computing system facilitating code conversion. The system includes at least one processor, a communication interface communicatively coupled to the at least one pro-cessor, and a memory device storing executable code. When executed, the executable code causes the at least one pro-cessor to, at least in part, obtain, via a web-based application from one or more user devices, translation request accom-panying source code of the one or more source files for conversion, and verify formatting of the source code of the one or more source files. The source code of the one or more source files is converted to target code comprising one or more target files, where the converting includes (i) mapping programming language functions of the source code to corresponding programming language functions of the tar-get code and (ii) utilizing, through one or more customized prompt templates, one or more large language models (LLMs) hosted by a cloud platform during the code con-version, wherein a source application that uses the source code comprises TIBCO™ software. The one or more target files are distributed, via the web-based application, to the one or more user devices.

Additionally, disclosed herein is a computing system. The system includes at least one processor, a communication interface communicatively coupled to the at least one pro-cessor, and a memory device storing executable code. When executed, the executable code causes the at least one pro-cessor to, at least in part, access, via a user interface of a computing device, a code assistant user interface of a web-based code assistant system. A translation request is submitted, via the web-based code assistant system, that accompanies source code of one or more source files for conversion, where the translation request indicates a target code that the source code is to be converted to, wherein a target application that uses the target code comprises MuleSoft® software. One or more target files that include the target code are received via the web-based code assistant system, where the target code includes target programming language functions corresponding to programming language functions of the source code.

Also disclosed herein is a computer-implemented method that includes obtaining, via the web-based application from the one or more user devices, a translation request accom-panying source code of one or more source files for con-version, and verifying formatting of the source code of the one or more source files. The method converts the source code of the one or more source files to target code compris-ing one or more target files, the converting (i) mapping programming language functions of the source code to corresponding programming language functions of the tar-get code and (ii) utilizing, through one or more customized prompt templates, the one or more LLMs during the code conversion, wherein a source application that uses the source code comprises TIBCO™ software. The method also distributes, via the web-based application, the one or more target files to the one or more user devices.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION OF THE SEVERAL VIEWS OF THE DRAWINGS

One or more aspects are particularly pointed out and distinctly claimed as examples in the claims at the conclu-sion of the specification. The foregoing as well as objects, features, and advantages of one or more aspects are apparent from the following detailed description taken in conjunction with the accompanying drawings in which:

FIG. 8 depicts a block diagram of an example method facilitating code conversion, according to one embodiment;

FIG. 9 depicts a block diagram of an example method, according to one embodiment;

FIG. 10 depicts a block diagram of an example method, according to one embodiment;

FIG. 11 depicts a block diagram of an example method, according to one embodiment;

FIG. 12 depicts a block diagram of an example method, according to one embodiment; and FIG. 13 depicts a block diagram of an example method, according to one embodiment.

DETAILED DESCRIPTION

Figure 1:
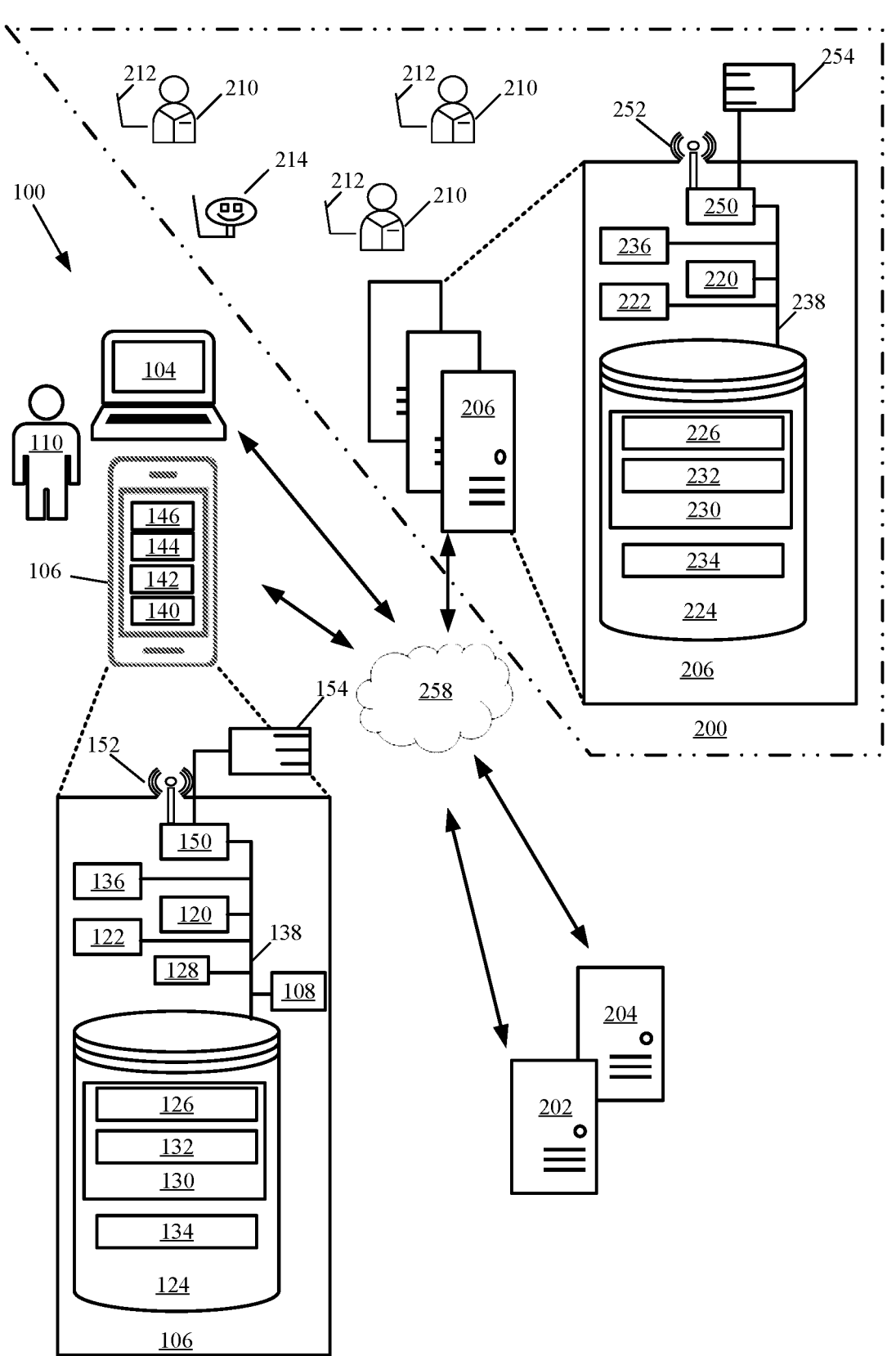
FIG. 1 illustrates an enterprise system, and environment thereof for, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted to avoid obscuring the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Like numbers refer to like elements throughout. Unless defined otherwise, technical and scientific terms used herein have the same meaning as commonly understood to one of ordinary skill in the art to which the presently disclosed subject matter pertains.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Furthermore, a device or structure that is configured in a certain way is configured in at least that way, but may also be configured in ways that are not listed.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains" or uses similar language to describe one or more steps or elements possesses those one or more steps or elements, but is not limited to possessing only those one or more steps or elements.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

As used herein, the terms "enterprise" or "provider" generally describes a person or business enterprise (e.g., company, organization, institution, business, university, etc.) that hosts, maintains, or uses computer systems that provide functionality for the disclosed systems and methods. The term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further, the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog-computing environment, and/or an edge-computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, required, or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). Also, the input and output system 136 may include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence (AI) and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network, in response to the training data, with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figures 2A, 2B, 2C:
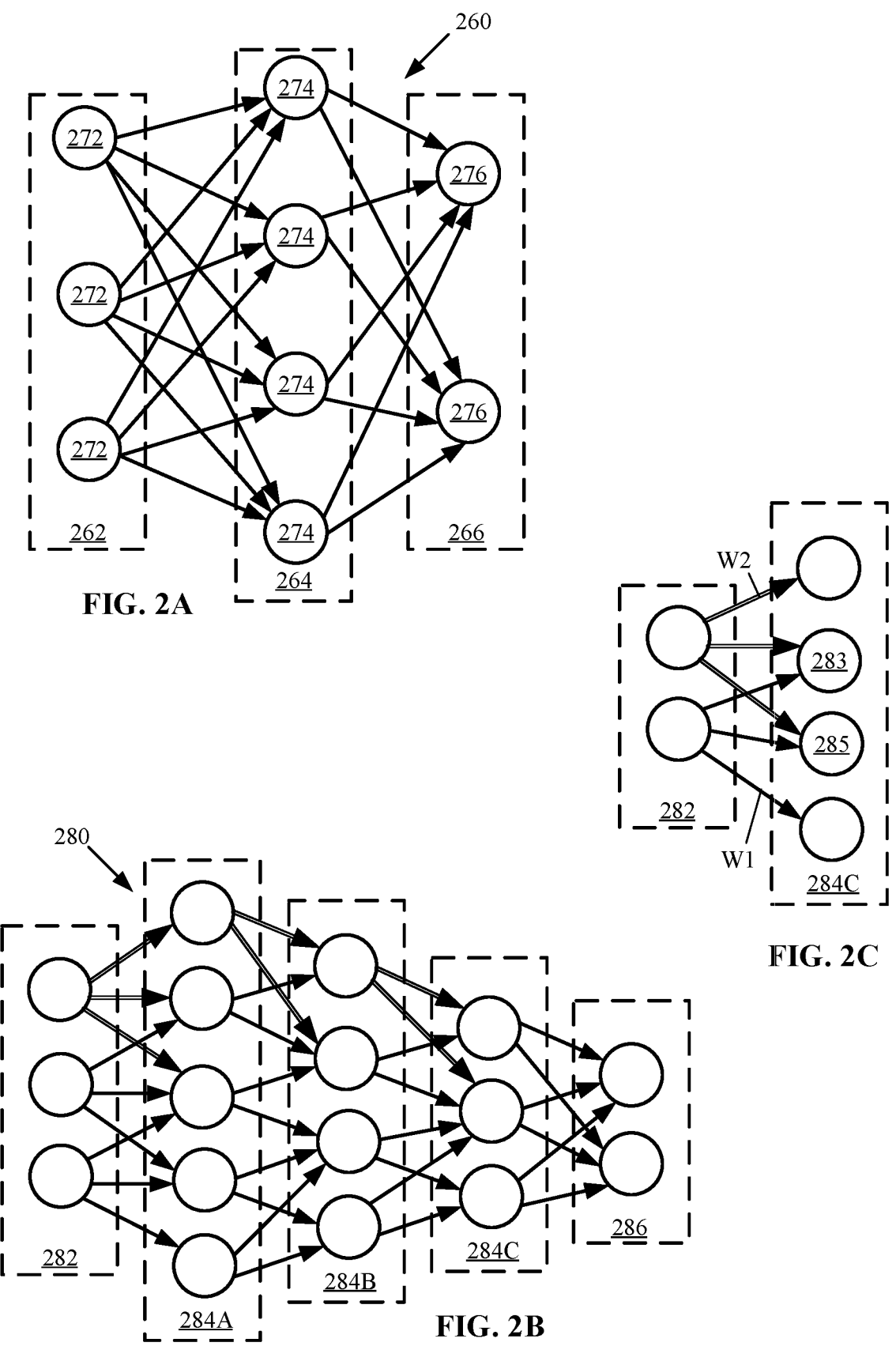
FIG. 2A is a diagram of a feedforward network, according to at least one embodiment, utilized in machine learning.
FIG. 2B is a diagram of a convolution neural network, according to at least one embodiment, utilized in machine learning.
FIG. 2C is a diagram of a portion of the convolution neural network of FIG. 2B, according to at least one embodi-ment, illustrating assigned weights at connections or neu-rons.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer

282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
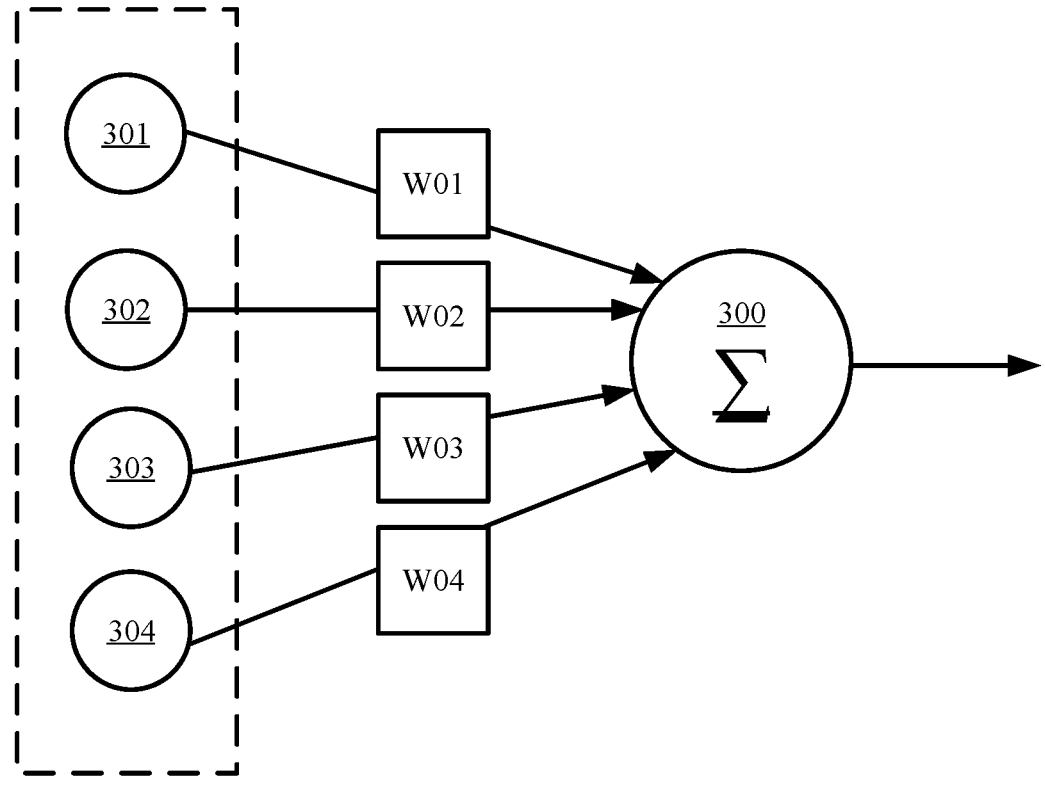
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
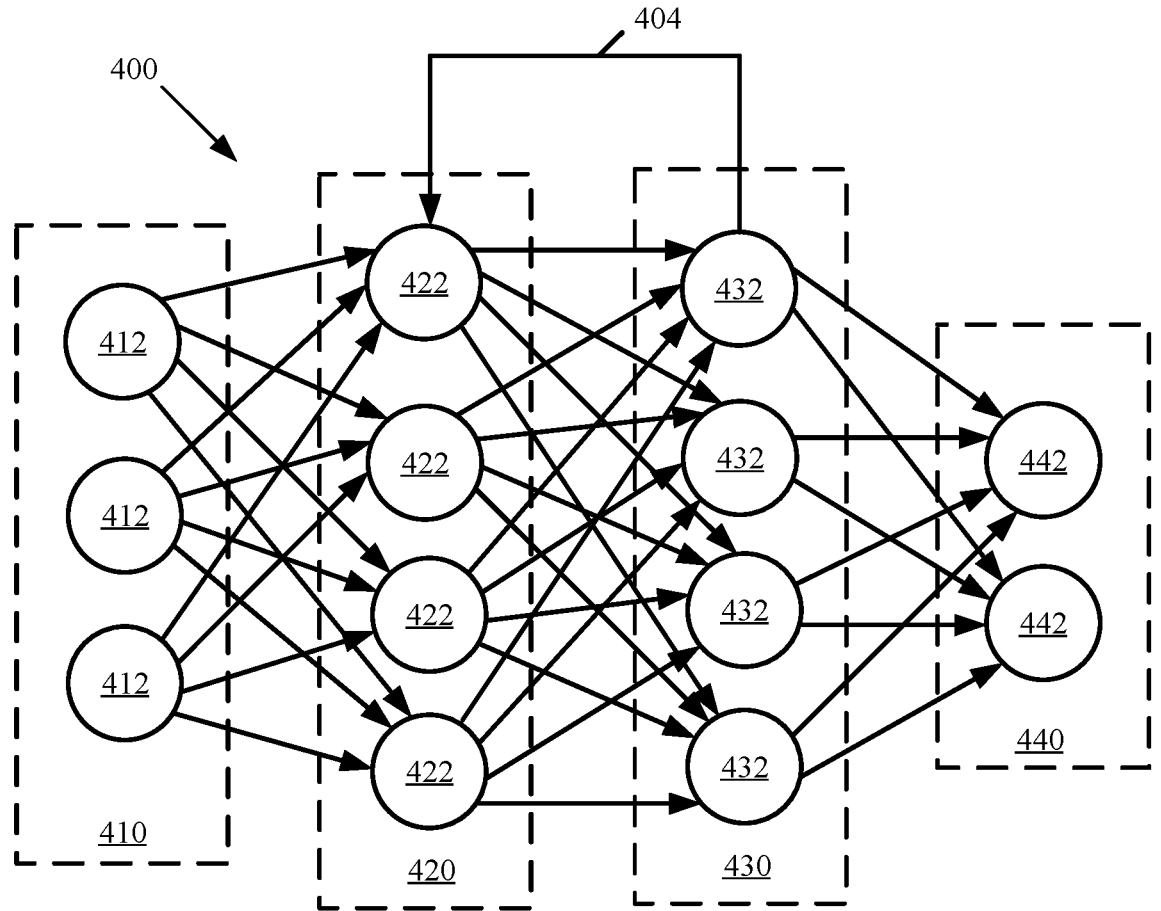
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of non-sequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
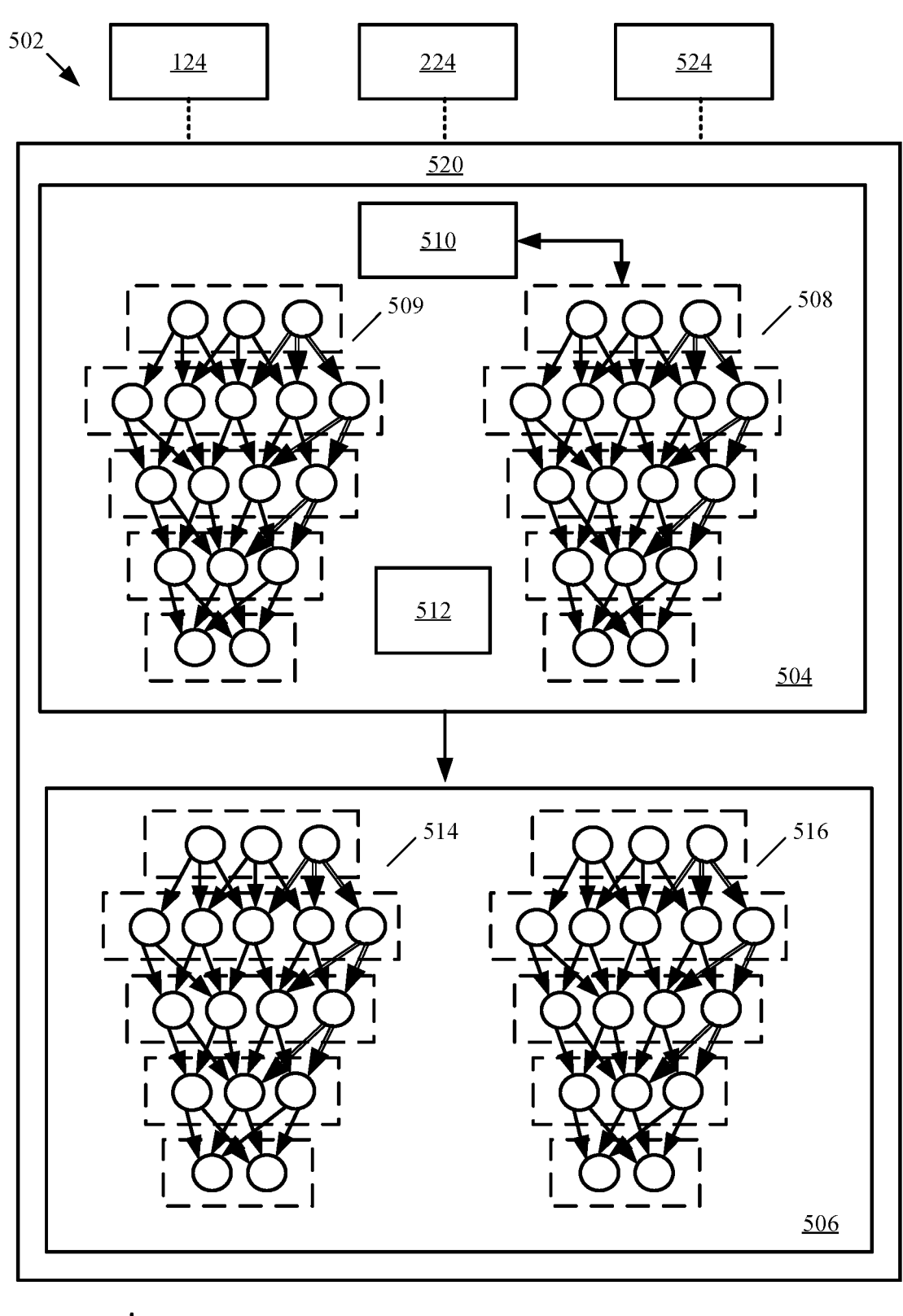
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform preprocessing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution. In some embodiments, the AI program 502 may be accelerated via a machine-learning framework 522 (e.g., hardware). The machine learning framework may include an index of basic operations, subroutines, and the like (primitives) typically implemented by AI and/or machine learning algorithms. Thus, the AI program 502 may be configured to utilize the primitives of the framework 522 to perform some or all of the calculations required by the AI program 502. Primitives suitable for inclusion in the machine learning framework 522 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
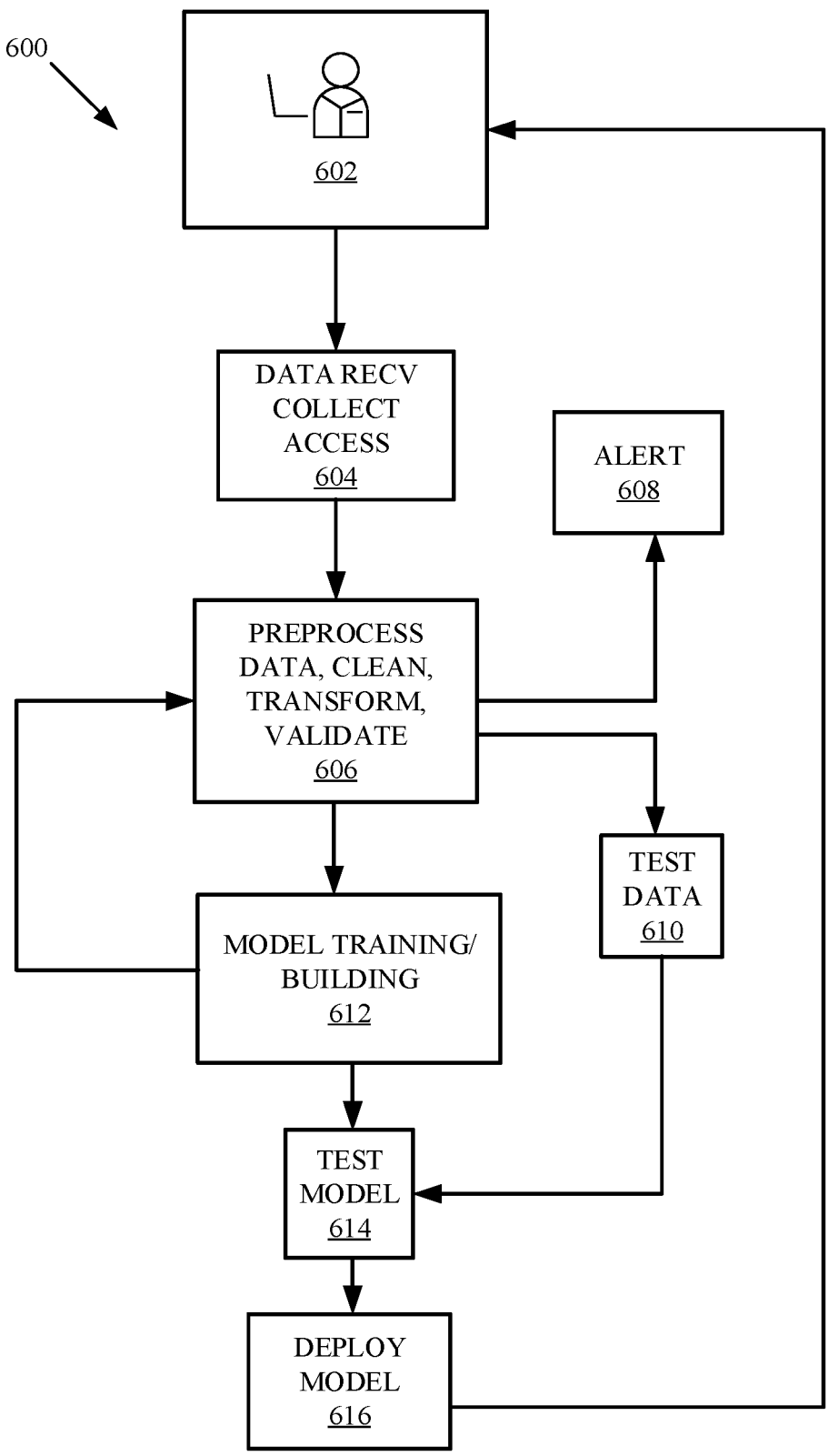
FIG. 6 is a flow chart representing a method, according to at least one embodiment, of model development and deploy-ment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected (e.g., to confirm that data values are within expected numerical ranges, that data sets are within any expected or required categories, and that data comply with any needed distributions such as within those categories).

Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning workflow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

An object of the present invention is to build a code assistant that utilizes a large language model for code conversion from source code for source applications that utilize TIBCO™ software to target code for target applications that utilize MuleSoft® software. This code conversion process leverages one or more customized prompt templates as part of a prompt engineering technique to perform the code conversion. This coding assistant is related to generative AI based systems including techniques such as prompt-based learning or in-context learning. In particular, the methods and system utilize an AI assistant that may be utilized by a technology team to accelerate migration from source applications that utilize TIBCO™ software to target applications that utilize MuleSoft® software. In particular, the code assistant is designed to streamline and significantly simplify enterprise-wide, large-scale migration from TIBCO™ middleware services to MuleSoft® middleware services.

Initially, in order to effectuate the process, a comprehensive understanding of each TIBCO Business Works™ process is essential in order to acquire an understanding of complete functionality of the process, all of the connectors involved, the transformation logic, error handling, and other relevant configurations. For each TIBCO Business Works™ process, all process files are mapped out, including process starter(s), sub-process(es), web service description(s), transformation logic to the target MuleSoft® file formats such as main flow, implementation of sub-flow, DataWeave file formats, Web Services Description Language (WSDL), and/ or representational state transfer (REST) software architecture using RESTful application programming interface (API) Modeling Language (RAML). Customized structured prompt templates are created that can effectively guide the large language model (LLM) in code conversion tasks for each file from source code designed for TIBCO™ software applications to target code designed for MuleSoft® software applications. These customized prompt templates are tested and refined in order to improve the model's output quality. An appropriate LLM is then selected and integrated into the application via an API, and an intuitive user interface is built to enable a user to submit and translate from source code designed for TIBCO™ software applications to target code designed for MuleSoft® software applications. The resulting target file(s) may include one or more extensible markup language (XML) files that are then evaluated for accuracy and performance.

Figure 7:
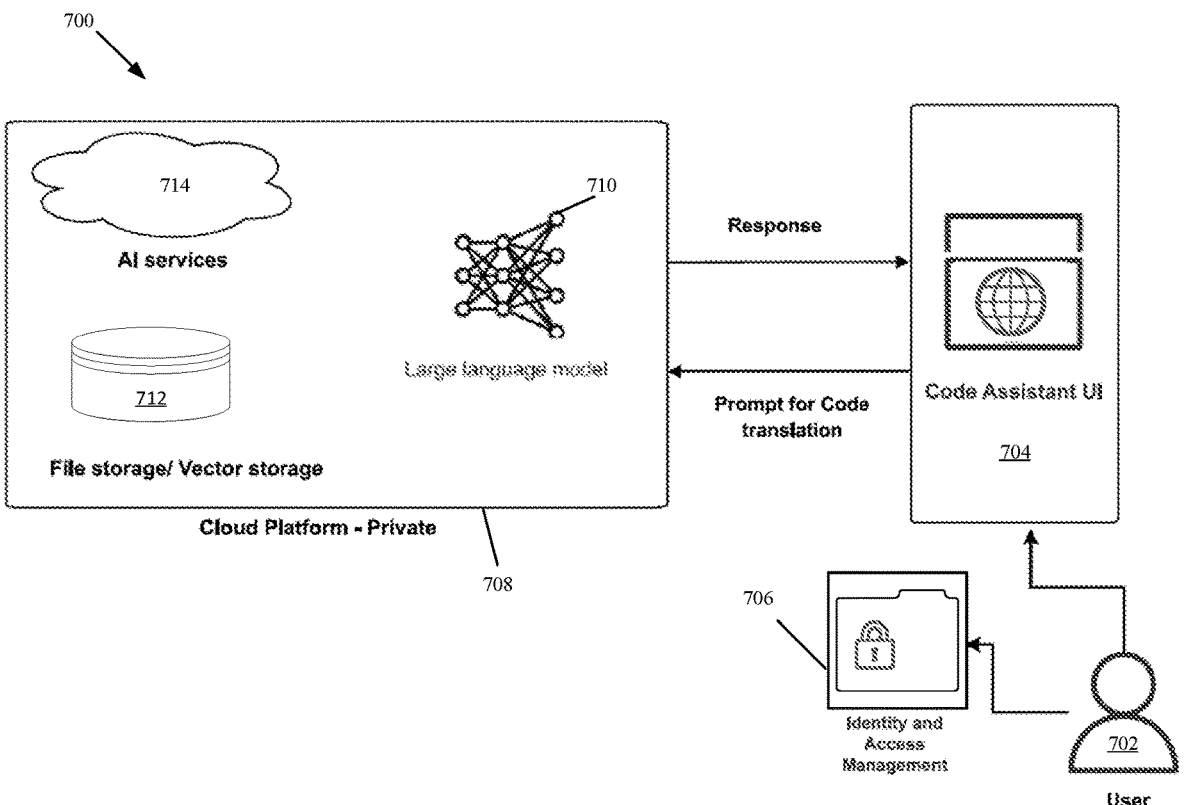
FIG. 7 depicts an environment of a code assistant com-puting system, according to one embodiment.

The code assistant automates the code translation/conversion between two different programming languages for two different integration platforms, specifically TIBCO™ software applications and MuleSoft® software applications. FIG. 7 depicts an environment of a code assistant computing system 700, according to one embodiment. The user 702 may be one or more engineers of an internal API enablement team, according to one embodiment, that would like to convert from the source code to the target code. In order to access the code assistant 704, the user needs to be authenticated, using identity and access management 706, in order to access the web-based code assistant 704 application. In one example, the access management 706 may include a directory (e.g., Azure Active Directory) that indicates groups of users that have different permissions to perform various processes. For example, the directory may indicate role-based access control of various users so that only specified users may modify the LLM(s), perform conversions, etc. The web-based code assistant 704 can make API calls to the LLM(s) 710, which are accessed via a cloud platform 708. In one embodiment, the cloud-platform 708 is a private cloud platform that provides file/vector storage 712, provides AI services 714, and/or hosts the LLM(s) 712.

A user 702 may have source code of a source application that may be submitted via a user interface of the code assistant 704 for conversion, where the source code of a typical TIBCO Business Works™ process may use TIBCO Business Works™ 5.X domain application for various source files. The code assistant 704 may be able to convert the source code into the target code that is designed for MuleSoft® software applications by mapping the source code to the corresponding programming language functions of the target code to generate the target XML files. Further, a customized, structured prompt template is used to guide the LLM(s) during the conversion. Once the conversion has occurred and the target file(s) are generated, the user can load and test the files to ensure that the files perform as expected.

Various customized prompt templates may be developed for different LLMs and different applications. The code assistant 704 may be configured to automatically select the appropriate LLM to perform the conversion from the source code used by TIBCO™ software to the target code used by MuleSoft® software. The LLM(s) may be trained in accordance with various training processes described herein to perform various conversions. The customized prompt templates may be modified with each iteration to more accurately handle the various aspects of the conversion. Training data is used to train the LLM(s) and the model is tested by comparing it to a target to determine whether the prompt templates guided the LLM(s) to address each aspect (e.g., a logger component/module, error handler file, etc.) and more context is added as needed with each iteration to improve accuracy of the model.

In some embodiments, the code assistant 704 may be able to obtain source code in language(s) other than languages used by TIBCO™ software applications and automatically select an appropriate LLM that has been trained to convert the source code language to a target code language used by MuleSoft® software. In other implementations, the code assistant 704, may also receive source code from a language utilized by TIBCO™ software applications and automatically select an appropriate LLM that has been trained to convert the source code language to a different language other than the language used by MuleSoft® software. The code assistant 704 may incorporate an automatic selector driven by definable criteria of a test set that automatically routes the translation request to the appropriate LLM(s). Some LLM(s) that could be selected may, in some examples, be LLM(s) trained using customized and structured prompt templates are used to guide the appropriate LLM through the conversion process. Other LLM(s) that could be selected may be standard LLM(s) that are widely available and other LLM(s) may be tuned by the entity that operates the code assistant 704. Many variations and modifications can be made by the code assistant 704 as needed based on trained LLM(s) being available to perform the conversion.

The LLM(s) may incorporate natural language processing in some instances in order to comprehend the source code and convert the source code to the target code. Various natural language processing (NLP) techniques may be used that may incorporate natural language understanding (NLU) processes. Example NLP functionality may process source code to identify purposes, topics, and subjects addressed within the source code, various source identifiers, content sources, column names, classifiers, and descriptions.

According to various embodiments, conversion of source code of source files to target code of one or more target files may in some cases be a one-to-one conversion where one source file is converted to one target file. In other embodiments, multiple source files may be converted to a single target file, and in other embodiments, a single source file may be converted to multiple target files. The functionalities and processes being converted may influence the ratio of the file conversion. For example, for TIBCO Business Works™, a process starter source file would become converted to multiple flow XML files, whereas in other examples the process starter may be converted to a single XML file.

When a user uploads a source file the system will check if the file is correctly formatted. If the file satisfies the format requirements then the conversion will be performed. Once the conversion is performed, the user will be able to navigate and visually inspect the file to determine whether there are any issues. The user may then be able to download the converted artifacts. In another embodiment, the user may pick the file path where the converted artifacts are to be saved to the file system.

In some embodiments, the review process is automated where the code assistant verifies that the source code is valid (e.g., by ensuring the target file(s) are wrapped under correct XML tags) prior to performing the conversion. In this example, a message may be provided to the user indicating that the source code satisfied the verification process or did not satisfy the verification process prior to the user selecting a "generate" control input on the user interface to generate the target file(s).

In one non-limiting example of a prompt template, the TIBCO Business Works™ 5.X process may be assessed by reviewing the complete functionality of the TIBCO Business Works™ process by listing all connectors, transformation logic, error handling mechanisms, and other relevant configurations. A new MuleSoft® software project may be created that is based on the connectors and endpoints used in the TIBCO Business Works™ process. Further, an appropriate connector is selected as an entry point to define the MuleSoft® software flow. For example, if the TIBCO Business Works™ process begins with an HTTP request, then a corresponding HTTP listener may be used as the corresponding connector for the MuleSoft® software. The conversion process also identifies the transformation logic used in the TIBCO Business Works™ process, and for each transformation, a corresponding MuleSoft® software component is generated. The system also analyzes how errors and exceptions are handled in the TIBCO Business Works™ process and establishes corresponding processes in the MuleSoft® software using error handlers and try scopes. Further, the system ensures all middleware connections (e.g., to databases, external systems, etc.) are configured and security configurations (e.g., OAuth, HTTPS, etc.) are correspondingly matched in the MuleSoft® software. Once the MuleSoft® software flow is established, rigorous tests are applied to ensure the behavior of the MuleSoft® software flow matches the TIBCO Business Works™ process. Various testing processes may be implemented (e.g., SOAP UI, API testing, etc.). Once completed and tested, the MuleSoft® software flow, including the transformations and configurations, may be documented for maintenance and future reference. The MuleSoft® software application may then be deployed to the desired environment (e.g., a local server, cloud service, etc.).

In another non-limiting example, the prompt may advise the LLM on how to analyze a source file (e.g., the service class, implementation type, operations, etc.) to identify any formatting issues and map or translate the TIBCO Business Works™ process to their MuleSoft® software flow equivalents. These prompts may advise the LLM to map the endpoint bindings and transport configurations to MuleSoft® software's HTTP listener configurations and ensure the SOAP configurations are properly reflected in MuleSoft® software's HTTP request configurations. The prompt may further instruct the LLM to create the MuleSoft® software flow XML file based on the mapping. The XML file may include HTTP listener configurations for each endpoint defined in the source file, separate flows or sub-flows for each operation, including any necessary Data Weave transformations for request and response, SOAP request and response configurations in accordance with the source file, error handling configurations for managing SOAP faults and other exceptions, an HTTP listener for incoming requests, appropriate flow references and processors to handle the logic of the original TIBCO Business Works™ process, error handling configurations, any necessary Data Weave transformations and/or independent flow element(s) for handling signature debit transaction inquiries, capturing both request and response. The prompt may advise the LLM to adhere to standards provided by MuleSoft® software, ensure functional equivalence and provide a clear and executable XML file as the output. Various other prompt templates may be used depending upon desired functionality.

FIG. 8 depicts a block diagram of an example method 800 facilitating code conversion, according to one embodiment. At block 805, the system receives, from one or more user devices, authentication information from a user to access a web-based application, the web-based application being configured to transmit one or more application programming interface (API) calls to a cloud platform hosting one or more large language models (LLMs), the one or more LLMs having been trained to interpret and extract meaning from a sequence of text. At block 810, the system performs data processing on the authentication information to authenticate the user. At block 815, the system provides, based on authenticating the user, access to the web-based application to the one or more user devices. At block 820, the system obtains, via the web-based application from the one or more user devices, a translation request accompanying source code of one or more source files for conversion. At block 825, the system verifies formatting of the source code of the one or more source files.

At block 830, the system converts the source code of the one or more source files to target code comprising one or more target files, the converting (i) mapping programming language functions of the source code to corresponding programming language functions of the target code and (ii) utilizing, through one or more customized prompt templates, the one or more LLMs during the code conversion, wherein a source application that uses the source code comprises TIBCO™ software and a target application that uses the target code comprises MuleSoft® software. The converting may be initiated using a connector prior to converting flow components of the source code. The one or more customized prompt templates may initiate, according to one embodiment, error handling management by causing the one or more LLMs to analyze how errors are handled in a source application using the source code an implementing similar error handling in a target application using the target code. In some embodiments, the customized prompt templates initiate security configurations by causing the one or more LLMs to analyze how security is addressed in a source application using the source code an implementing similar security configurations in a target application using the target code. According to various embodiments, the programming language functions of the source code comprise at least one selected from the group consisting of a service class, an implementation type, operations, endpoint bindings, and a web services description language (WSDL). In some embodiments, the mapping includes mapping endpoint bindings and transport configurations. In some examples, the mapping includes verifying simple object access protocol (SOAP) configurations are accurately reflected by the corresponding programming language functions of the target code. In some embodiments, the code conversion includes establishing separate flows and sub-flow, including DataWeave language transformations, for each corresponding programming language function of the corresponding language functions of the target code. In various embodiments, the one or more customized prompt templates instruct the one or more LLMs to handle logic flow of the programming language functions of the source code. At block 835, the system distributes, via the web-based application, the one or more target files to the one or more user devices. In one embodiment, the one or more target files include one or more extensible markup language (XML) files.

FIG. 9 depicts a block diagram of an example method 900, according to one embodiment. At block 905, the system accesses, via a user interface of a computing device, a code assistant user interface of a web-based code assistant system. At block 910, the system submits, via the web-based code assistant system, a translation request accompanying source code of one or more source files for conversion, the translation request indicating a target code that the source code is to be converted to, wherein a source application that uses the source code comprises TIBCO™ software and a target application that uses the target code comprises MuleSoft® software. At block 915, the system receives, via the web-based code assistant system, one or more target files comprising the target code, wherein the target code includes target programming language functions corresponding to programming language functions of the source code. In some embodiments, the one or more target files include one or more extensible markup language (XML) files). The programming language functions of the source code may include one selected from the group consisting of a service class, an implementation type, operations, endpoint bindings, and a web services description language (WSDL).

FIG. 10 depicts a block diagram of an example method 1000, according to one embodiment. At block 1005, the system obtains, via a web-based application from one or more user devices, a translation request accompanying source code of one or more source files for conversion. At block 1010, the system verifies formatting of the source code of the one or more source files. At block 1015, the system converts the source code of the one or more source files to target code comprising one or more target files, the converting including: (i) mapping programming language functions of the source code to corresponding programming language functions of the target code, and (ii) utilizing, through one or more customized prompt templates, the one or more LLMs during the code conversion, wherein a source application that uses the source code comprises TIBCO™ software and a target application that uses the target code comprises MuleSoft® software. At block 1020, the system distributes, via the web-based application, the one or more target files to the one or more user devices.

FIG. 11 depicts a block diagram of an example method 1100, according to one embodiment. At block 1105, the system transmits, via a user interface of a computing device, authentication data received from one or more user inputs to access a web-based code assistant system, the web-based code assistant system being configured to transmit one or more application programming interface (API) calls to a cloud platform hosting one or more large language models (LLMs), the one or more LLMs having been trained to interpret and extract meaning from a sequence of text. At block 1110, the system accesses, via the user interface of the computing device and based on the authentication information being authenticated, a code assistant user interface of the web-based code assistant system. At block 1115, the system submits, via the web-based code assistant system, a translation request accompanying source code of one or more source files for conversion, the translation request indicating a target code that the source code is to be converted to, wherein a source application that uses the source code comprises TIBCO™ software and a target application that uses the target code comprises MuleSoft® software. At block 1120, the system receives, via the web-based code assistant system, one or more target files comprising the target code, wherein the target code includes target programming language functions corresponding to programming language functions of the source code.

FIG. 12 depicts a block diagram of an example method 1200, according to one embodiment. At block 1205, the system obtains, via a web-based application from one or more user devices, a translation request accompanying source code of one or more source files for conversion. At block 1210, the system verifies formatting of the source code of the one or more source files. At block 1215, the system converts the source code of the one or more source files to target code comprising one or more target files, the converting including: (i) mapping programming language functions of the source code to corresponding programming language functions of the target code, and (ii) utilizing, through one or more customized prompt templates, one or more large language models (LLMs) hosted by a cloud platform during the code conversion, wherein a source application that uses the source code comprises TIBCO™ software. At block 1220, the system distributes, via the web-based application, the one or more target files to the one or more user devices.

FIG. 13 depicts a block diagram of an example method 1300, according to one embodiment. At block 1305, the system accesses, via a user interface of a computing device, a code assistant user interface of the web-based code assistant system. At block 1310, the system submits, via the web-based code assistant system, a translation request accompanying source code of one or more source files for conversion, the translation request indicating a target code that the source code is to be converted to, wherein a target application that uses the target code comprises MuleSoft® software. At block 1315, the system receives, via the web-based code assistant system, one or more target files comprising the target code, wherein the target code includes target programming language functions corresponding to programming language functions of the source code.

According to various embodiments, authentication information is submitted to the web-based code assistant system to authenticate a user of the computing device in order to grant the user access to the web-based code assistant system.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computing system facilitating code conversion, comprising:

at least one processor;

a communication interface communicatively coupled to the at least one processor; and a memory device storing executable code that, when executed, causes the at least one processor to:

obtain, via a web-based application from one or more user devices, a translation request accompanying source code of one or more source files for conversion;

verify formatting of the source code of the one or more source files;

convert the source code of the one or more source files to target code comprising one or more target files, the converting including: (i) mapping programming language functions of the source code to corresponding programming language functions of the target code, and (ii) utilizing, through one or more customized prompt templates, one or more large language models (LLMs) hosted by a cloud platform during the code conversion, wherein a source application that uses the source code comprises TIBCO™ software; and distribute, via the web-based application, the one or more target files to the one or more user devices.

2. The code assistant computing system of claim 1, wherein the converting is initiated using a connector prior to converting flow components of the source code.

3. The code assistant computing system of claim 1, wherein the customized prompt templates initiate error handling management by causing the one or more LLMs to analyze how errors are handled in a source application using the source code and implementing similar error handling in a target application using the target code.

4. The code assistant computing system of claim 1, wherein the customized prompt templates initiate security configurations by causing the one or more LLMs to analyze how security is addressed in a source application using the source code and implementing similar security configurations in a target application using the target code.

5. The code assistant computing system of claim 1, wherein the programming language functions of the source code comprise at least one selected from the group consisting of a service class, an implementation type, operations, endpoint bindings, and a web services description language (WSDL).

6. The code assistant computing system of claim 1, wherein the mapping includes mapping endpoint bindings and transport configurations.

7. The code assistant computing system of claim 1, wherein the mapping includes verifying simple object access protocol (SOAP) configurations are accurately reflected by the corresponding programming language functions of the target code.

8. The code assistant computing system of claim 1, wherein the code conversion includes establishing separate flows and sub-flows, including DataWeave language transformations, for each corresponding programming language function of the corresponding programming language functions of the target code.

9. The code assistant computing system of claim 1, wherein the one or more customized prompt templates instruct the one or more LLMs to handle logic flow of the programming language functions of the source code.

10. The code assistant computing system of claim 1, wherein the one or more target files comprise one or more extensible markup language (XML) files.

11. A computer-implemented method, comprising:

obtaining, via a web-based application from one or more user devices, a translation request accompanying source code of one or more source files for conversion;

verifying formatting of the source code of the one or more source files;

converting the source code of the one or more source files to target code comprising one or more target files, the converting including: (i) mapping programming language functions of the source code to corresponding programming language functions of the target code, and (ii) utilizing, through one or more customized prompt templates, the one or more LLMs during the code conversion, wherein a source application that uses the source code comprises TIBCO™ software; and distributing, via the web-based application, the one or more target files to the one or more user devices.

12. The computer-implemented method of claim 11, wherein the converting is initiated using a connector prior to converting flow components of the source code.

13. The computer-implemented method of claim 11, wherein the customized prompt templates initiate error handling management by causing the one or more LLMs to analyze how errors are handled in a source application using the source code and implementing similar error handling in a target application using the target code.

14. The computer-implemented method of claim 11, wherein the customized prompt templates initiate security configurations by causing the one or more LLMs to analyze how security is addressed in a source application using the source code and implementing similar security configurations in a target application using the target code.

15. The computer-implemented method of claim 11, wherein the programming language functions of the source code comprise at least one selected from the group consisting of a service class, an implementation type, operations, endpoint bindings, and a web services description language (WSDL).

16. The computer-implemented method of claim 11, wherein the mapping includes mapping endpoint bindings and transport configurations.

17. A non-transitory computer-readable storage medium, the computer-readable storage medium including instructions that, when executed by a processor, cause the processor to:

obtain, via a web-based application from one or more user devices, a translation request accompanying source code of one or more source files for conversion;

verify formatting of the source code of the one or more source files;

convert the source code of the one or more source files to target code comprising one or more target files, the converting including: (i) mapping programming language functions of the source code to corresponding programming language functions of the target code, and (ii) utilizing, through one or more customized prompt templates, one or more large language models (LLMs) hosted by a cloud platform during the code conversion, wherein a source application that uses the source code comprises TIBCO™ software; and distribute, via the web-based application, the one or more target files to the one or more user devices.

18. The computer-readable storage medium of claim 17, wherein the converting is initiated using a connector prior to converting flow components of the source code.

19. The computer-readable storage medium of claim 17, wherein the customized prompt templates initiate error handling management by causing the one or more LLMs to analyze how errors are handled in a source application using the source code and implementing similar error handling in a target application using the target code.

20. The computer-readable storage medium of claim 17, wherein the customized prompt templates initiate security configurations by causing the one or more LLMs to analyze how security is addressed in a source application using the source code and implementing similar security configurations in a target application using the target code.

*    *    *    *    *